United States Patent
Nath et al.

(10) Patent No.: US 7,684,899 B2
(45) Date of Patent: Mar. 23, 2010

(54) PROCESS CONTROLLER HAVING IMPROVED SURGE CAPACITY CONTROL AND RELATED METHODOLOGY

(75) Inventors: Ravi Nath, Houston, TX (US); Sanjay K Sharma, Houston, TX (US)

(73) Assignee: Honeywell International Inc., Morristown, NJ (US)

( * ) Notice: Subject to any disclaimer, the term of this patent is extended or adjusted under 35 U.S.C. 154(b) by 397 days.

(21) Appl. No.: 11/859,432

(22) Filed: Sep. 21, 2007

(65) Prior Publication Data
US 2009/0024253 A1 Jan. 22, 2009

Related U.S. Application Data

(60) Provisional application No. 60/951,084, filed on Jul. 20, 2007.

(51) Int. Cl.
*G05D 7/00* (2006.01)
*G05D 11/00* (2006.01)
(52) U.S. Cl. ....................... 700/282; 137/386
(58) Field of Classification Search ............ 700/40–50, 700/275, 281–285; 137/207, 386, 395, 593; 702/45, 55
See application file for complete search history.

(56) References Cited

U.S. PATENT DOCUMENTS

| 4,265,263 A | | 5/1981 | Hobbs | |
| 4,386,623 A | * | 6/1983 | Funk et al. | 137/2 |
| 4,466,054 A | * | 8/1984 | Shigemasa et al. | 700/42 |
| 4,604,681 A | * | 8/1986 | Sakashita | 700/78 |
| 4,956,763 A | | 9/1990 | Stewart, Jr. et al. | |
| 5,335,185 A | * | 8/1994 | Pitts et al. | 700/282 |
| 5,396,923 A | * | 3/1995 | Allen et al. | 137/487.5 |
| 5,706,193 A | * | 1/1998 | Linzenkirchner | 700/42 |
| 6,622,056 B1 | * | 9/2003 | Lindell | 700/106 |
| 6,936,665 B2 | * | 8/2005 | Stephens et al. | 526/65 |
| 7,284,563 B2 | * | 10/2007 | Partridge et al. | 137/14 |
| 7,546,170 B2 | * | 6/2009 | Ayala et al. | 700/45 |
| 2001/0049460 A1 | * | 12/2001 | Herzog | 585/654 |
| 2008/0103747 A1 | * | 5/2008 | Macharia et al. | 703/11 |
| 2008/0103748 A1 | * | 5/2008 | Axelrud et al. | 703/12 |

* cited by examiner

*Primary Examiner*—M. N. Von Buhr
(74) *Attorney, Agent, or Firm*—Jetter & Assoc., P.A.; Neil R. Jetter (57) ABSTRACT

A method and related non-linear level controller (NLLC) for controlling surge capacity in a processing system including at least one vessel receiving an inlet flow of a fluid including a liquid subject to variation and supplying an outlet flow to at least one downstream unit includes the step of computing a first parameter relating to a difference between a current inventory in the vessel and a prevailing inventory limit for the vessel and a second parameter relating to a difference between the current inventory and an inventory set point. An unforced time to reduce the first parameter by a first percentage (T*) is compared to a first time T1. The inlet flow or outlet flow is then controlled based on the first parameter if $T^* \leq T1$ and based on the second parameter if $T^* > T1$.

19 Claims, 6 Drawing Sheets

PROCESS CONTROLLER HAVING IMPROVED SURGE CAPACITY CONTROL AND RELATED METHODOLOGY

CROSS-REFERENCE TO RELATED APPLICATIONS

This application claims priority to Provisional Application No. 60/951,084 entitled "PROCESS CONTROLLER HAVING IMPROVED SURGE CAPACITY CONTROL AND RELATED METHODOLOGY" filed on Jul. 20, 2007, which is incorporated by reference in its entirety into the present application.

FIELD OF THE INVENTION

The present invention relates generally to process control systems, and more specifically to a controller for controlling the level in at least one surge vessel, and related control methods and systems therefrom.

BACKGROUND

Processing facilities, such as manufacturing plants, chemical plants and oil refineries, are typically managed using process control systems. Valves, pumps, motors, heating/cooling devices, and other industrial equipment typically perform actions needed to process materials in the processing facilities. Among other functions, the process control systems often control industrial operation in the processing facilities.

A very common problem encountered in many industries, such as the oil and petrochemical industry, is compensating for variations in the flow rate of fluids comprising liquid coming into a particular processing unit. Such disturbances are usually common and ordinary events in the routine operation of the process.

One strategy has been to include one or more surge tanks in the liquid flow lines or to utilize certain volume capacity ranges within existing vessels to provide temporary capacity for smoothing out the flow variations. The liquid levels in these vessels, e.g., surge tanks, bottoms of fractionation columns and accumulators, and so forth, may then be allowed to vary within limits so that the outlet flow changes from these vessels are significantly smaller than the instantaneous inlet flow changes. Each liquid level thus acts as a buffer for the downstream units. Thus, this surge capacity, which may be receiving flow from a number of different units, by allowing the level in the surge tank to deviate from its setpoint while staying within allowable limits, attenuates the effects of any feed flow disturbance so that the disturbances do not propagate quite as strongly and the operation of the process is steadier.

A useful surge volume control algorithm should have several important characteristics. The level in the surge vessel should not exceed the high and low level limits to ensure that the vessel will not overflow or empty. In the absence of any disturbance over a long period of time, the level should line out at the target level (setpoint). The available surge volume should be utilized effectively to minimize the effect of a feed rate change and other process disturbances on the downstream process. The algorithm should be able to handle surge vessels of all shapes, such as vertical cylindrical, horizontal cylindrical, spherical, and vessels with internal baffles and various end types. The method should be relatively simple so that it can be easily maintained and executed at high speed on a control system platform. Also, tuning the controller should not be difficult and should not require much effort.

Microprocessor based Proportional, Integral and Derivative (PID) controllers are currently the most commonly used controllers for level control to reduce variations in the flow supplied to a downstream process. However, the PID algorithms run by PID controllers are generally known to have two significant limitations. First, PID algorithms cannot generally address non-linearities. Second, PID algorithms cannot be used to specify high and low limits for liquid levels explicitly. Moreover, if the inlet flow has a large noise component, such as due to an upstream process that is noisy, control using a PID algorithm becomes increasingly ineffective. What is needed is a non-linear level controller (NLLC) and related algorithm to more effectively allow surge vessels to absorb incoming fluctuations in the inlet flow so that the outlet liquid flow to a downstream process is more consistent.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A method for controlling surge capacity in a processing system including at least one vessel receiving an inlet flow of a fluid comprising liquid subject to variation and supplying an outlet flow to at least one downstream unit includes the steps of computing a first parameter relating to a difference between a current inventory in the vessel and a prevailing inventory limit for the vessel and a second parameter relating to a difference between the current inventory and an inventory set point. An unforced time to reduce the first parameter by a first percentage (T*) is compared to a first time T1. The inlet flow or outlet flow is then adjusted based on the first parameter if T*≦T1 and based on the second parameter if T*>T1.

The method can further comprise the step of computing the unforced time to reduce the first parameter by a first percentage (T*). In this embodiment the step of computing the unforced time (T*) can comprise extrapolation using the current inventory and a time derivative of the inventory at a time corresponding to the current inventory.

The controlling step can comprise computing a first minimum change in the inlet or outlet flow to reduce the first parameter by the first percentage in T1 if T*≦T1 and computing a second minimum change in the inlet or outlet flow to reduce the second parameter by a second percentage in a time T2 if T*>T1. In this embodiment the controlling step can comprise controlling a flow parameter relating to the inlet flow or the outlet flow based on the first minimum change or the second minimum change. In one embodiment, the first and second predetermined percentage is 100%. In one embodiment, T1 is less than T2.

The controlling step comprises changing the inlet flow or the outlet flow. The method can comprise downstream or upstream control.

A non-linear level controller (NLLC) for controlling surge capacity in a processing system comprising at least one vessel receiving an inlet flow of a fluid comprising liquid subject to variation and supplying an outlet flow to at least one downstream processing unit, comprises a CPU. The CPU runs stored executable software implementing the steps of computing a first parameter relating to a difference between a current inventory in the vessel and a prevailing inventory limit for the vessel and a second parameter relating to a difference between the current inventory and an inventory set point; and comparing an unforced time to reduce the first parameter by a first percentage (T*) in a first time T1. The NLLC includes a plurality of inputs coupled to the CPU operable for receiving process information comprising fluid comprising liquid information during a process run by the processing unit, and a plurality of outputs driven by the CPU for sending control signals to control the inlet flow or outlet flow based on said first parameter if $T^* \leq T1$ and based on the second parameter if $T^* > T1$. The NLLC can be operable to compute the unforced time to reduce the first parameter by a first percentage ($T^*$).

A processing system comprises equipment for performing actions to process fluid comprising liquids in the processing system, the system comprising at least a first vessel, the first vessel having a capacity and an inlet for receiving an inlet flow of the fluid comprising liquid and an outlet for supplying an outlet flow to at least one downstream unit, and a non-linear level controller (NLLC) for controlling surge capacity in said system coupled to a flow controller, the flow controller coupled to a control valve operable to control the inlet flow to or the outlet flow from the vessel. A non-linear level controller (NLLC) for controlling surge capacity in a processing system comprising at least one vessel receiving an inlet flow of a fluid comprising liquid subject to variation and supplying an outlet flow to at least one downstream processing unit, comprises a CPU. The CPU runs stored executable software implementing the steps of computing a first parameter relating to a difference between a current inventory in the vessel and a prevailing inventory limit for the vessel and a second parameter relating to a difference between the current inventory and an inventory set point; and comparing an unforced time to reduce the first parameter by a first percentage ($T^*$) in a first time $T1$.

The NLLC includes a plurality of inputs coupled to the CPU operable for receiving process information comprising fluid comprising liquid information during a process run by the processing unit, and a plurality outputs driven by the CPU for sending control signals to control the inlet flow or outlet flow based on said first parameter if $T^* \leq T1$ and based on the second parameter if $T^* > T1$. The NLLC can be operable to compute the unforced time to reduce the first parameter by a first percentage ($T^*$).

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

Embodiments of the present invention are more particularly described in the following description and examples that are intended to be illustrative only since numerous modifications and variations therein will be apparent to those of ordinary skill in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of".

A method for controlling surge capacity comprises the steps of providing a first vessel having a capacity and an inlet for receiving an inlet flow of a fluid comprising liquid subject to variation and an outlet for supplying an outlet flow of the fluid comprising liquid to at least one downstream unit. The downstream unit can include, for example, a distillation tower, a furnace, or another vessel, for example, a separator vessel.

Although described herein in a processing system having a single vessel controlled by non-linear level controllers (NLLCs) according to the present invention, processing systems can include a plurality of vessels controlled by non-linear level controllers (NLLCs) according to the present invention, including serial and parallel connected vessel arrangements.

The fluid comprising liquid can comprise liquid only, or a liquid mixed with a gas. The liquid itself can be a liquid mixture, such as oil and water.

Conventional level sensors generally provide the liquid level measurement. The volume of liquid in the vessel is referred to herein in its common usage as the inventory and is generally measured in terms of the height of the liquid level.

A discrepancy (difference) between a current inventory in the vessel and a prevailing inventory limit for the vessel (referred to herein as "capacity deviation" (CD)), and a discrepancy (difference) between the current inventory and a desired inventory set point (referred to herein as set point deviation (SD) are calculated.

Figure 1:
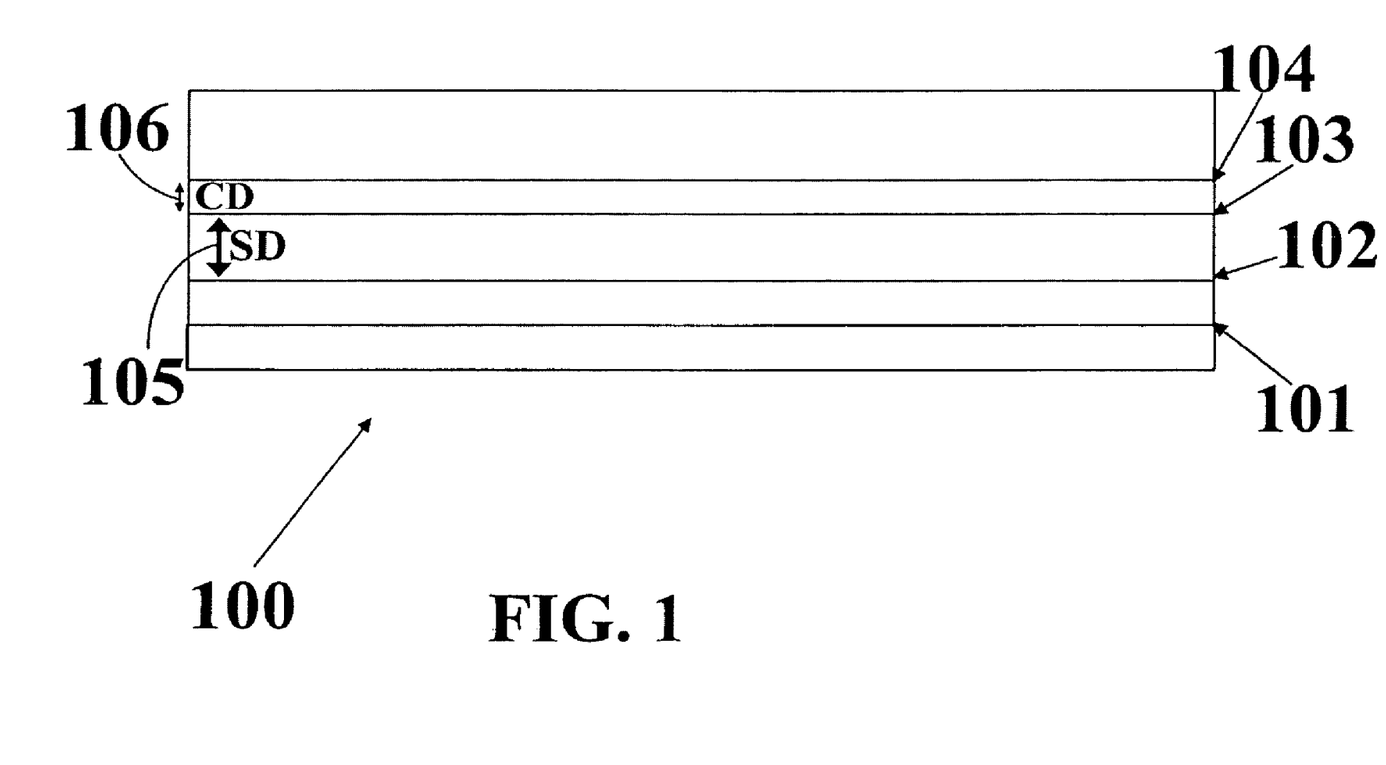
FIG. 1 depicts a vessel having a liquid therein that defines several parameters according to an embodiment of the invention, including capacity deviation (CD) and setpoint deviation (SD).

FIG. 1 depicts a vessel 100 having a liquid therein shown reaching the current level (the inventory) 103, and the parameters low level limit 101, setpoint 102 and high level limit 104. The desired level is shown as the setpoint 102. The operating capacity of the vessel 100 is specified in terms of a low level limit (shown as a low limit 101) and a high level limit (shown as a high limit 104), both beyond which operation is not desirable. Low limit 101, setpoint 102 and high level limit 104, together with the current level 103 define the differential parameters SD 105 and CD 106 used in an embodiment of the present invention. As known in the art, to keep the liquid level at the setpoint 102 would mean that the outlet flow will follow the fluctuations in the inlet flow. As shown, the current level 103 is above the setpoint 102. However, the current level 103 can also be at or below the setpoint 102.

As described above, CD is a measure of discrepancy in the current level 103 and the prevailing limit, which is generally either the low limit 101 or the high limit 104. Although FIG. 1 shows the prevailing limit as being the high limit and thus CD defined by high limit 104, the prevailing limit can also be the low limit 101. The prevailing limit can be detected by the NLLC algorithm, generally based of the sign of the time derivative of the liquid level in the vessel. For example, if the level in the vessel is increasing, the sign of the derivative is positive, and the prevailing limit is generally the high limit 104. Conversely, if the level is decreasing, the sign of the derivative is negative, and the prevailing limit is generally the low limit 101. CD is thus measured in terms of the volume (available or excess) from the current level to generally reach the prevailing limit.

Setpoint Deviation (SD) is a measure of discrepancy of the current level 103 from the setpoint 102. SD can be measured in terms of the volume (available or excess) from the current level to generally reach the setpoint.

A first time (T1) to reduce CD by a first predetermined percentage (e.g. 100%/exhaust) and a second time (T2) to reduce SD by a second predetermined percentage (e.g. 100%/exhaust) is generally provided. Values for T1 and T2 are generally derived from empirical process tuning tests known in the art.

The tuning constants (T1 and T2) are generally derived from observation of plant operating data, the surge vessel dimensions, the nature and magnitude of disturbances experienced based on actual plant operating data, and control objectives defined by engineers or other plant personnel, T1 is generally greater than T2. It may also be possible to determine T1 and T2 through modeling. In one particular embodiment of the present invention the respective predetermined percentages can both be 100%, and T1=15 minutes and T2=60 minutes.

Figure 4:
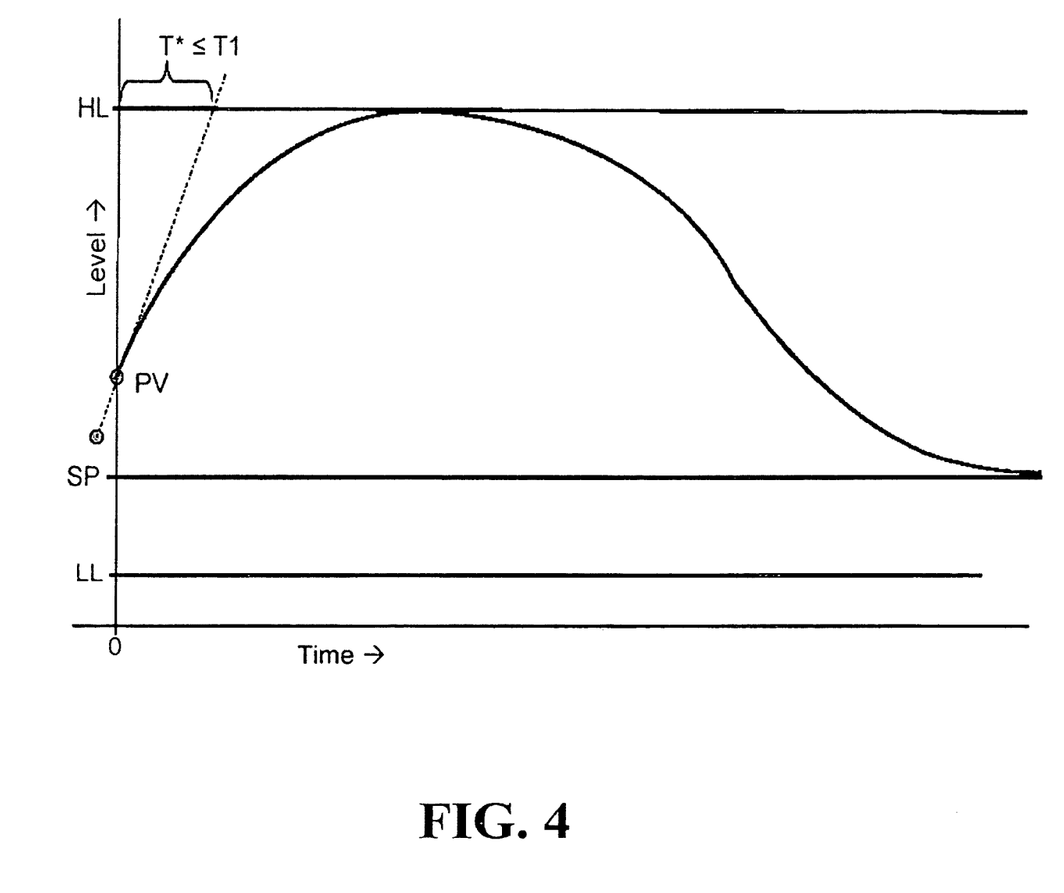
FIG. 4 shows simulated results for a relatively fast disturbance that demonstrates performance for a NLLC controller according to an embodiment of the invention positioned in the processing system as shown in FIG. 3A for $T^* \leq T1$.
Figure 5:
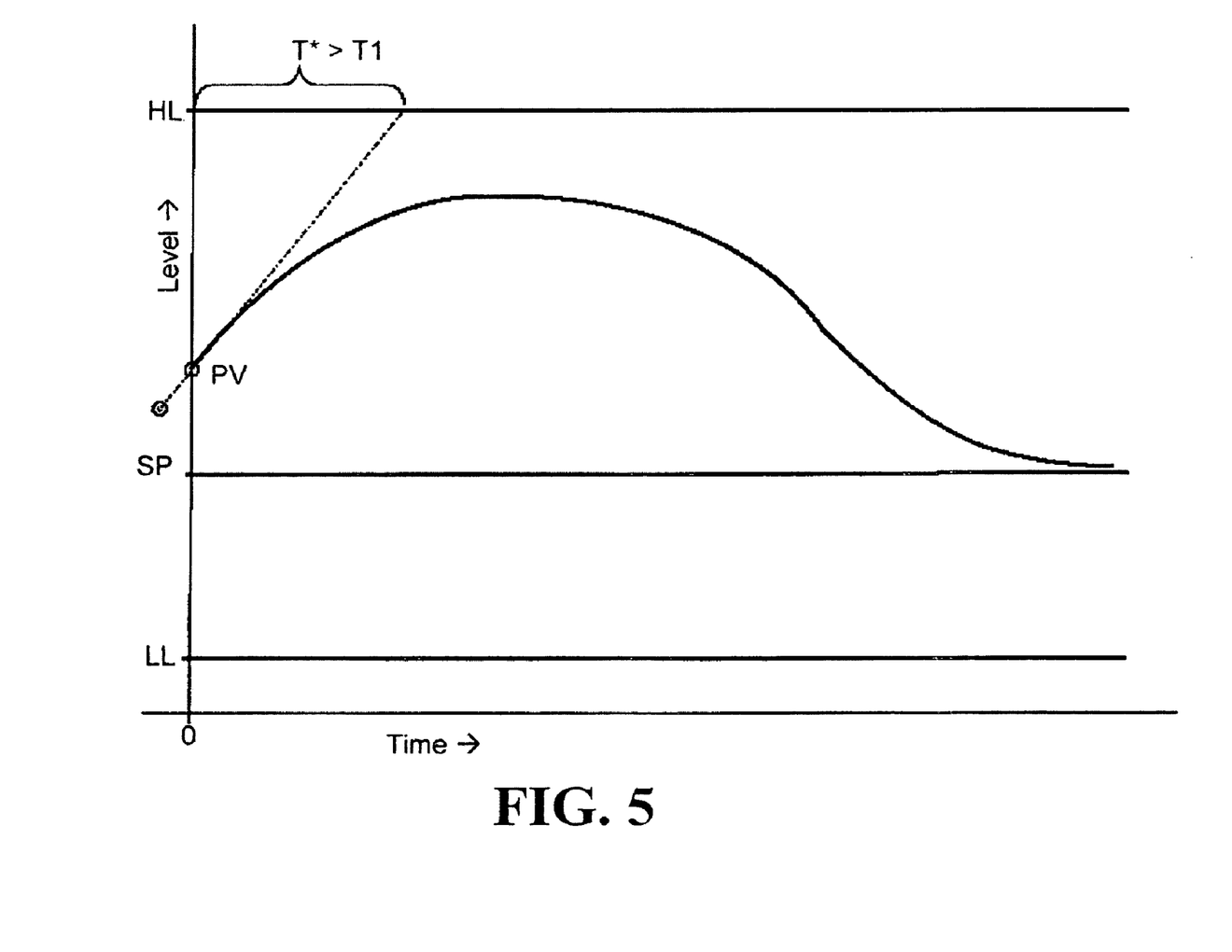
FIG. 5 shows simulated results for a relatively slow disturbance that demonstrates performance for NLLC controller according to an embodiment of the invention again positioned in the processing system as shown in FIG. 3A for $T^* > T1$ for an outlet flow.

In one embodiment of the invention, an unforced time (referred to herein as T*) to reduce CD by the first predetermined percentage is calculated. In the case the first predetermined percentage is 100%, T* is thus defined as the time to completely exhaust CD corresponding to a volume of the fluid comprising liquid if no changes to the flows are made by the controller (e.g. the status quo). Thus, the conditions for calculating the unforced time can be based on the most recent measurement of the current level 103 that is stored in memory associated with the NLLC, and/or the change in the current level 103 since the last execution of the NLLC algorithm. FIGS. 4 and 5 described below show determination of T* using the level at t=0 and the time derivative of the level near t=0 for the case that the predetermined percentage is 100%.

Figure 2:
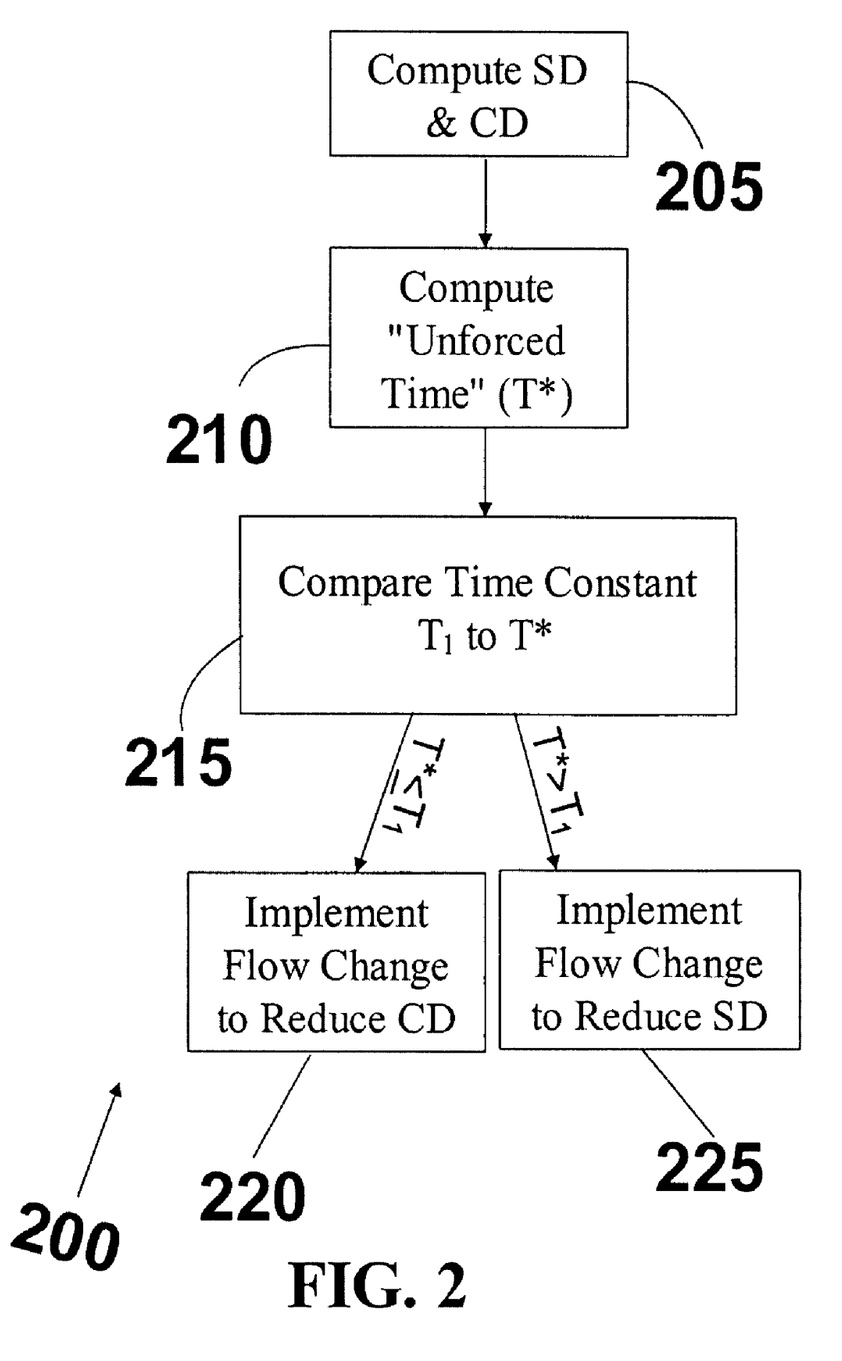
FIG. 2 is a flow chart which lists a sequence of steps according to an embodiment of the invention that comprises a non-linear control algorithm which based on the differential parameters CD and SD and the relative speed of the flow disturbance, controls surge capacity for a vessel within a processing system.

FIG. 2 is a flow chart which lists a sequence of steps according to an embodiment of the invention that comprises a non-linear control algorithm 200 which is based on the differential parameters CD and SD and the relative speed of the flow disturbance, which controls surge capacity for a vessel within a processing system. In step 205, SD and CD as described above are calculated. In step 210, T* as described above can be calculated, or otherwise provided (e.g. stored from an earlier computation). In step 215 T* is then compared to a time constant T1. If T*>T1 a first minimum change in the outlet flow from the vessel to reduce CD by the first predetermined percentage in T1 is computed and implemented as a flow change in step 220. T*≦T1 generally corresponds to the variation/disturbance being relatively fast. In the case T*>T1, generally corresponding to the variation/disturbance in inlet flow being relatively slow, a second minimum change in the outlet flow from the vessel to reduce (e.g. exhaust in one embodiment) SD to the second predetermined percentage in T2 is calculated and implemented as a flow change in step 225.

The flow change can be implemented using a flow control parameter. In one embodiment the flow control parameter can be the actual fluid comprising liquid flow or a change in the fluid comprising liquid flow. In a typical application, as described below relative to FIGS. 3A and 3B, NLLCs according to embodiments of the invention can control the output flow setpoint of a flow controller which is coupled to a control valve to implement the first minimum flow change (when T*≦T1) or the second minimum flow change (T*>T1).

Figure 3A:
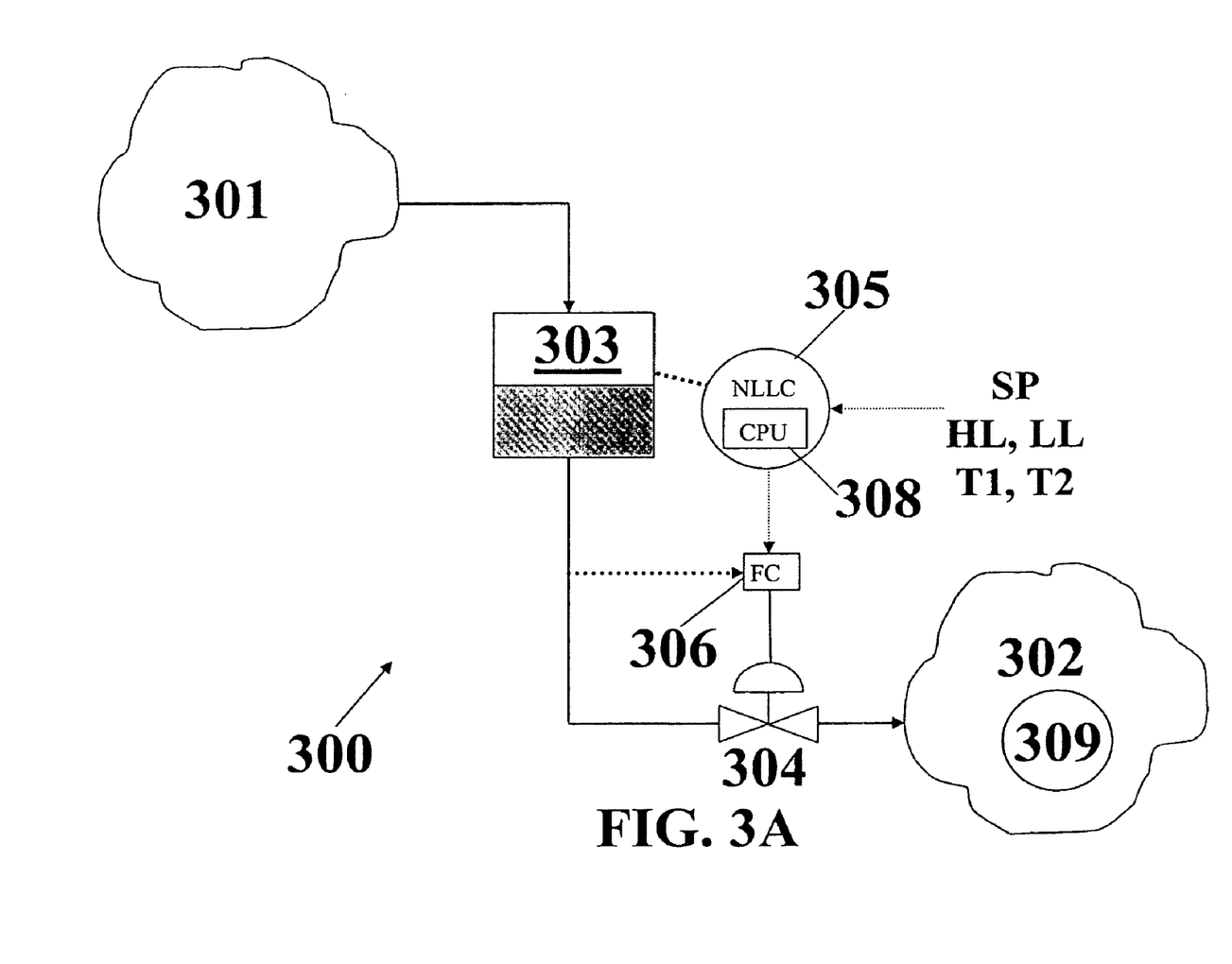
FIG. 3A shows a depiction of an exemplary implementation of a non-linear level controller (NLLC) according to an embodiment of the invention for downstream surge control in a processing system having a surge vessel.

FIG. 3A shows a depiction of an exemplary implementation of a non-linear level controller (NLLC) according to an embodiment of the invention for downstream surge control in a processing system 300 having a vessel 303. Reference 301 represents an upstream process that provides an outlet flow comprising a fluid comprising liquid flow that fluctuates significantly and may also be noisy. The outlet flow from the upstream process 301 is coupled to an inlet of a downstream process 302 via vessel 303. Downstream process 302 can be, for example, a distillation tower, a furnace, or a separator vessel comprising equipment 309, such as valves, pumps and motors. 305 refer to a NLLC according to an embodiment of the present invention. NLLC generally includes central processing unit (CPU) 308, as well as associated memory. NLLC 305 is operable to store or receive a plurality of inputs, such as setpoint (SP), high level (HL), low level (LL), and T1 and T2 described above, as well as current level (inventory) data from vessel 303. NLLC 305 generally executes on a control system computer and adjusts system flows including a flow of the fluid comprising liquid to downstream process 302 via a flow controller (FC) 306 which together with control valve 304 adjusts the outlet flow from vessel 303.

Figure 3B:
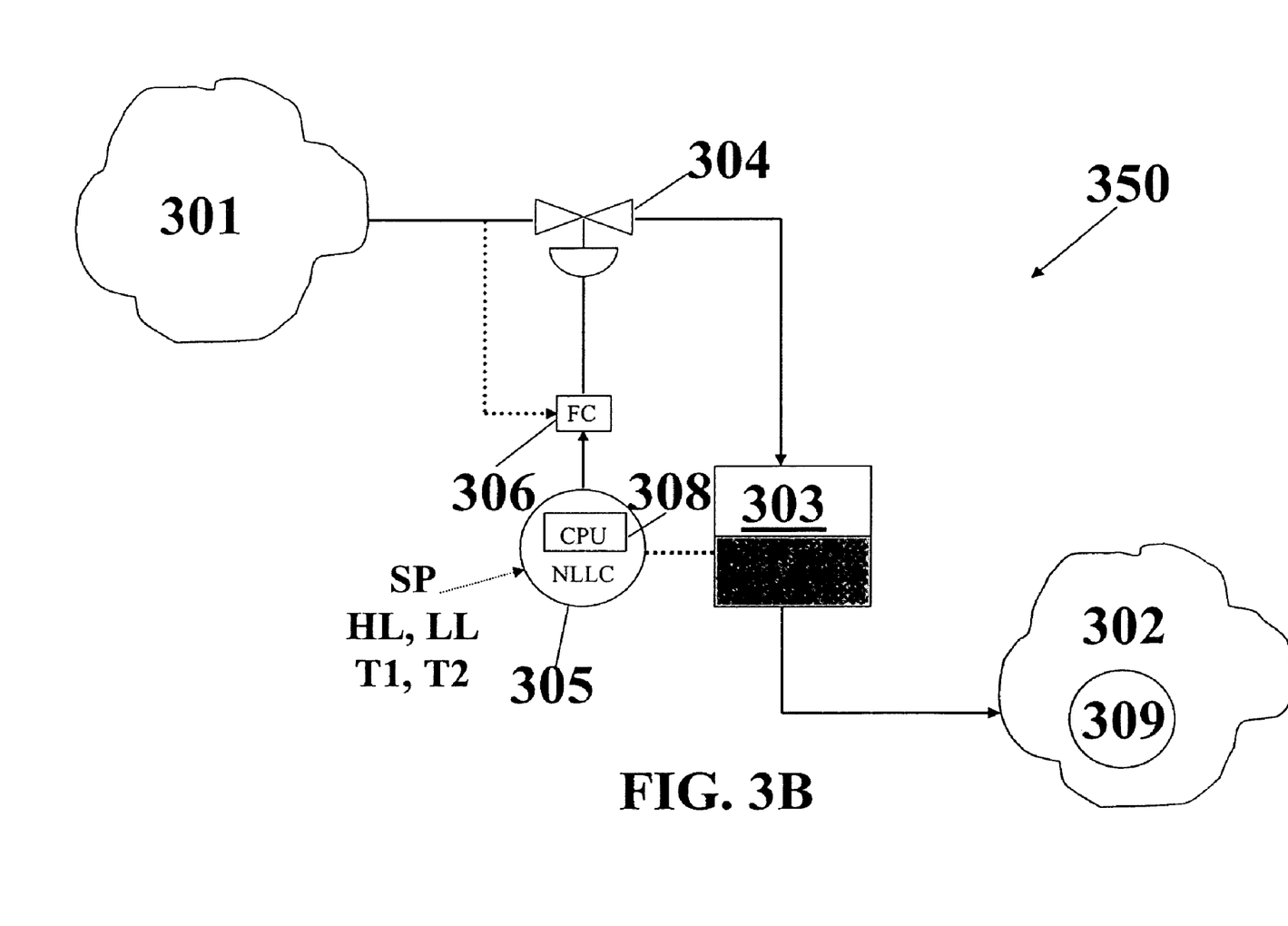
FIG. 3B shows a depiction of an exemplary implementation of a non-linear level controller (NLLC) according to an embodiment of the invention for upstream surge control in a processing system having a surge vessel.

FIG. 3B shows a depiction of an exemplary implementation of a non-linear level controller (NLLC) according to an embodiment of the invention for upstream surge control in a processing system 350 having a surge vessel 303. In this arrangement, under control of NLLC 303, the inlet flow to vessel 303 can be used to control the level in the vessel 303. Control in the upstream control case is generally achieved by multiplying the flow changes described relative to a downstream control system described above by −1.

Embodiments of the present invention provide several significant advantages. Algorithms according to the invention are relatively simple, and are generally based on two calculated parameters, CD and SD. The algorithms are generally non-linear permitting good accuracy, particularly when the processes are significantly non-linear. Due to the simplicity of the executable code based on the few required parameters, the code can be run at high speed to allow frequent updates, such as on the order of several seconds.

Surge vessels that can be level controlled by non-linear level controllers (NLLCs) according to embodiments of the present invention include, but are not limited to, Distillation Columns or Fractionator bottom sumps, Degassing Drums, Gas Separators, Storage Tanks, Feed Flash Drums, Reflux Accumulators, Day Tanks, Surge Drums, Suction Scrubbers, Slug Catchers, Lube Oil Separators, Head Tanks, and Deaerators.

NLLCs according to embodiments of the invention can be used in a variety of processing facilities that control fluid comprising liquid surge capacity, such as various manufacturing plants, as well as chemical plants and oil refineries, gas processing plants and offshore production platforms.

EXAMPLES

FIG. 4 shows simulated results for a relatively fast disturbance that demonstrates NLLC performance for a controller according to an embodiment of the present invention positioned in the downstream controlled processing system as shown in FIG. 3A for $T^* \leq T1$. The prevailing limit used was the high limit due to the positive derivative (increase in flow) at t=0 where the current level is indicated as PV. The y-axis is the level in the vessel and the x-axis is time. FIG. 4 demonstrates that a high level of mitigation of inlet flow variation has been achieved by fully utilizing the available vessel capacity (allowing the level to reach the high level, HL, in a non-linear fashion, without any significant overshoot. Thereafter, the vessel level approached the desired level setpoint (SP), again in a non-linear fashion.

FIG. 5 shows a simulated result for a relatively slow disturbance that demonstrates NLLC performance for a controller according to an embodiment of the present invention again positioned in the downstream controlled processing system as shown in FIG. 3A, this time for $T^* > T1$. FIG. 5 demonstrates that the inlet flow variation has been successfully mitigated by utilizing only some of the available vessel capacity as evidence by the current level never reaching the high level, HL. Thereafter, the vessel level returns back to the desired level setpoint shown as SP.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present disclosure contemplates a machine readable medium containing instructions, or that which receives and executes instructions from a propagated signal so that a device, such as connected to a network environment can send or receive data, and to communicate over the network using the instructions.

While the computer-readable storage medium can be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

We claim:

1. A method for controlling surge capacity in a processing system comprising at least one vessel receiving an inlet flow of a fluid comprising liquid subject to variation and supplying an outlet flow to at least one downstream unit, comprising the steps of:
   computing a first parameter relating to a difference between a current inventory in said vessel and a prevailing inventory limit for said vessel and a second parameter relating to a difference between said current inventory and an inventory set point;
   comparing an unforced time to reduce said first parameter by a first percentage (T*) in a first time T1, and
   controlling said inlet flow or said outlet flow based on said first parameter if $T^* \leq T1$ and based on said second parameter if $T^* > T1$.

2. The method of claim 1, further comprising the step of computing said unforced time (T*) to reduce said first parameter by a first percentage.

3. The method of claim 2, wherein said step of computing said unforced time (T*) comprises extrapolation using said current inventory and a time derivative of said inventory at a time corresponding to said current inventory.

4. The method of claim 1, wherein said controlling step comprises computing a first minimum change in said inlet or said outlet flow to reduce said first parameter by said first percentage in said T1 if $T^* \leq T1$ and computing a second minimum change in said inlet or said outlet flow to reduce said second parameter by a second percentage in a time T2 if $T^* > T1$.

5. The method of claim 4, wherein said controlling step comprises controlling a flow parameter relating to said inlet flow or said outlet flow based on said first minimum change or said second minimum change.

6. The method of claim 4, wherein said first and second predetermined percentage is 100%.

7. The method of claim 4, wherein said T1 is greater than said T2.

8. The method of claim 1, wherein said controlling comprises changing said outlet flow.

9. The method of claim 1, wherein said method comprises downstream control.

10. The method of claim 1, wherein said method comprises upstream control.

11. A non-linear level controller (NLLC) for controlling surge capacity in a processing system comprising at least one vessel receiving an inlet flow of a fluid comprising liquid subject to variation and supplying an outlet flow to at least one downstream processing unit, comprising:
- a CPU running stored executable software implementing the following steps:
- computing a first parameter relating to a difference between a current inventory in said vessel and a prevailing inventory limit for said vessel and a second parameter relating to a difference between said current inventory and an inventory set point; and comparing an unforced time to reduce said first parameter by a first percentage (T*) in a first time T1;
- a plurality of inputs coupled to said CPU operable for receiving process information comprising fluid comprising liquid information during a process run by said processing unit, and
- a plurality outputs driven by said CPU for sending control signals to control said inlet flow or said outlet flow based on said first parameter if $T^* \leq T1$ and based on said second parameter if $T^* > T1$.

12. The NLLC of claim 11, wherein said NLLC is operable to compute said unforced time (T*) to reduce said first parameter by a first percentage.

13. The NLLC of claim 11, wherein said computing said unforced time (T*) comprises extrapolation using said current inventory and a time derivative of said inventory at a time corresponding to said current inventory.

14. The NLLC of claim 11, wherein said NLLC is operable to compute a first minimum change in said inlet or said outlet flow to reduce said first parameter by said first percentage in said T1 if $T^* \leq T1$ and computing a second minimum change in said inlet or said outlet flow to reduce said second parameter by a second percentage in a time T2 if $T^* > T1$.

15. The NLLC of claim 14, wherein said T1 is greater than said T2.

16. A processing system, comprising
equipment for performing actions to process fluid comprising liquids in said processing system, said system comprising at least a first vessel, said first vessel having a capacity and an inlet for receiving an inlet flow of said fluid comprising liquid and an outlet for supplying an outlet flow to at least one downstream unit, and
a non-linear level controller (NLLC) for controlling surge capacity in said system coupled to a flow controller, said flow controller coupled to a control valve operable to control said inlet flow to or said outlet flow from said vessel, said NLLC comprising:
- a CPU running stored executable software implementing the following steps:
- computing a first parameter relating to a difference between a current inventory in said vessel and a prevailing inventory limit for said vessel and a second parameter relating to a difference between said current inventory and an inventory set point; and comparing an unforced time to reduce said first parameter by a first percentage (T*) in a first time T1;
- a plurality of inputs coupled to said CPU operable for receiving process information comprising fluid comprising liquid information during a process run by said processing unit, and
- a plurality outputs driven by said CPU for sending control signals to control said inlet flow or said outlet flow based on said first parameter if $T^* \leq T1$ and based on said second parameter if $T^* > T1$.

17. The system of claim 16, wherein said NLLC is operable to compute said unforced time (T*) to reduce said first parameter by a first percentage.

18. The system of claim 17, wherein said computing said unforced time (T*) comprises extrapolation using said current inventory and a time derivative of said inventory at a time corresponding to said current inventory.

19. The system of claim 16, wherein said NLLC is operable to compute a first minimum change in said inlet or said outlet flow to reduce said first parameter by said first percentage in said T1 if $T^* \leq T1$ and computing a second minimum change in said inlet or said outlet flow to reduce said second parameter by a second percentage in a time T2 if $T^* > T1$.

* * * * *